United States Patent [19]
Finney

[11] Patent Number: 5,294,082
[45] Date of Patent: Mar. 15, 1994

[54] SPATULA HOLDER

[75] Inventor: Lloyd M. Finney, Oklahoma City, Okla.

[73] Assignee: Continental Carlisle, Inc., Oklahoma City, Okla.

[21] Appl. No.: 915,518

[22] Filed: Jul. 20, 1992

[51] Int. Cl.⁵ .............................................. A47G 29/00
[52] U.S. Cl. .................................. 248/37.6; 248/309.1
[58] Field of Search ................... 248/37.3, 37.6, 309.1, 248/316.5, 694, 293; 211/88

[56] References Cited

U.S. PATENT DOCUMENTS

| | | | |
|---|---|---|---|
| 4,923,153 | 5/1990 | Matsui et al. | 248/316.5 X |
| 4,930,740 | 6/1990 | Vogt | 248/309.1 |
| 5,127,616 | 7/1992 | Carney | 248/37.3 X |

Primary Examiner—Ramon O. Ramirez
Attorney, Agent, or Firm—Dougherty, Hessin, Beavers & Gilbert

[57] ABSTRACT

A hood-mountable spatula holder which includes a mounting part, a fold-up part and a hinge subassembly interconnecting the mounting part and the fold-up part. The fold-up part carries a blade support ledge which projects toward the mounting part when the spatula holder is mounted on a vertical surface. Fastener mounting elements are provided to facilitate mounting of the spatula holder on a vertical surface, and to concurrently retain the fold-up part thereof, folded up into an operative position in juxtaposition to the mounting part.

14 Claims, 3 Drawing Sheets

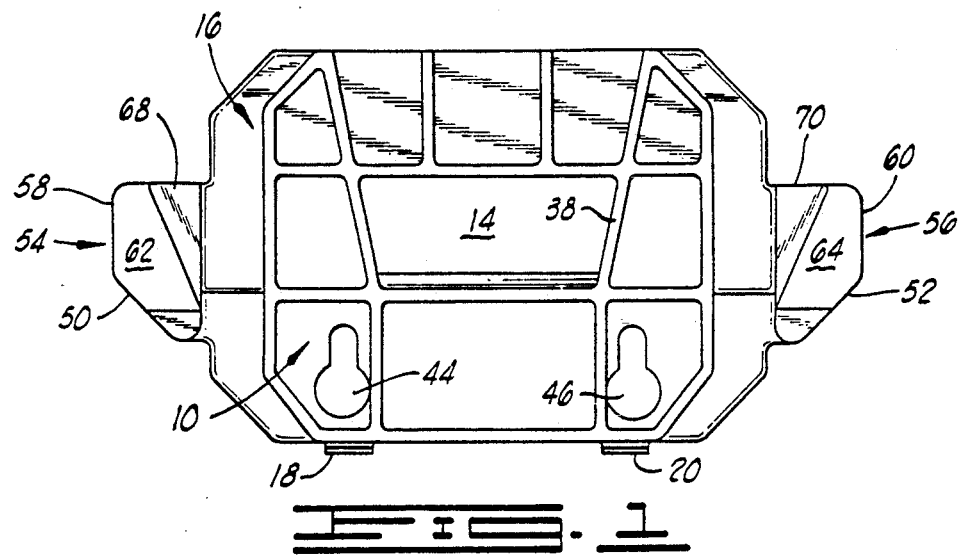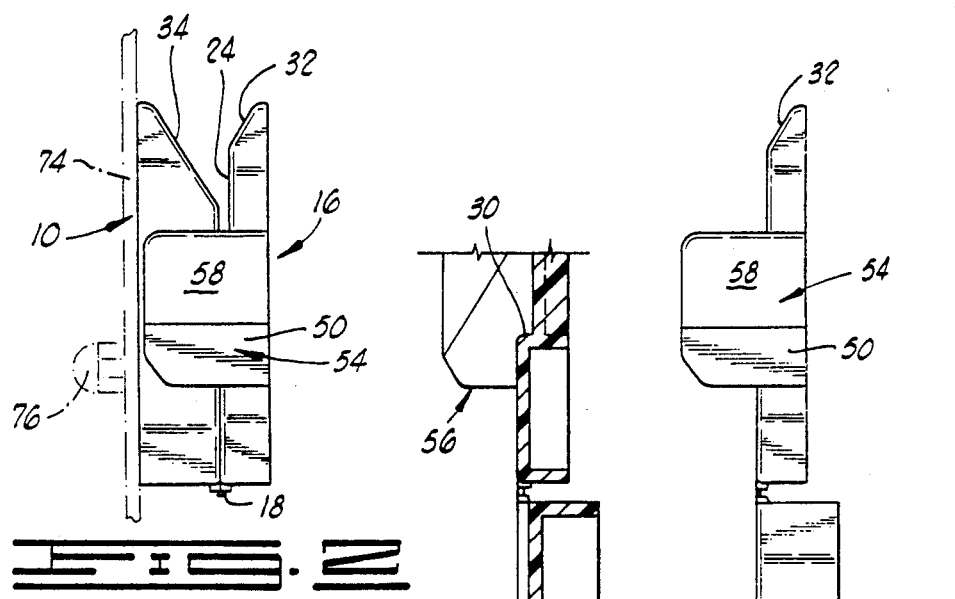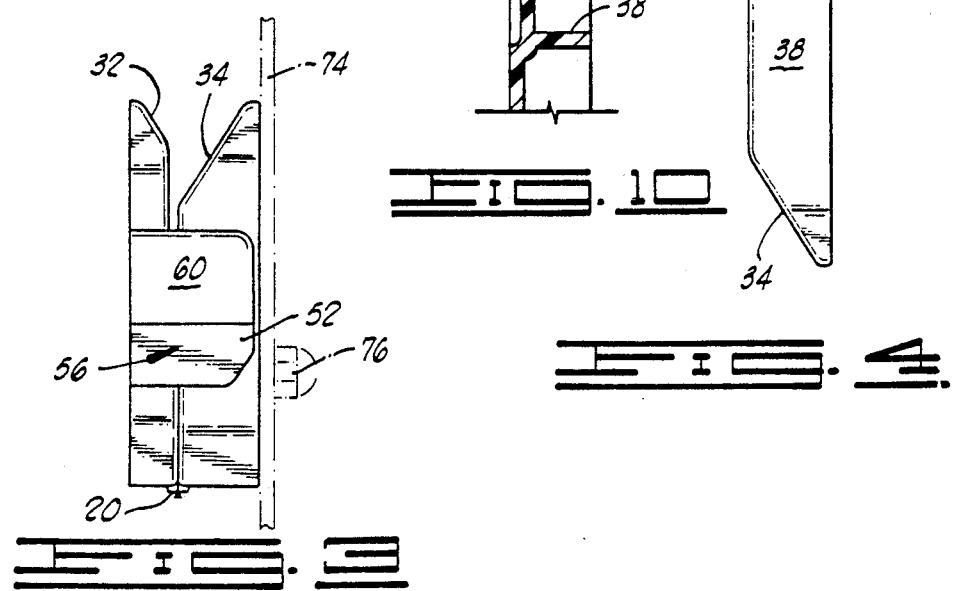

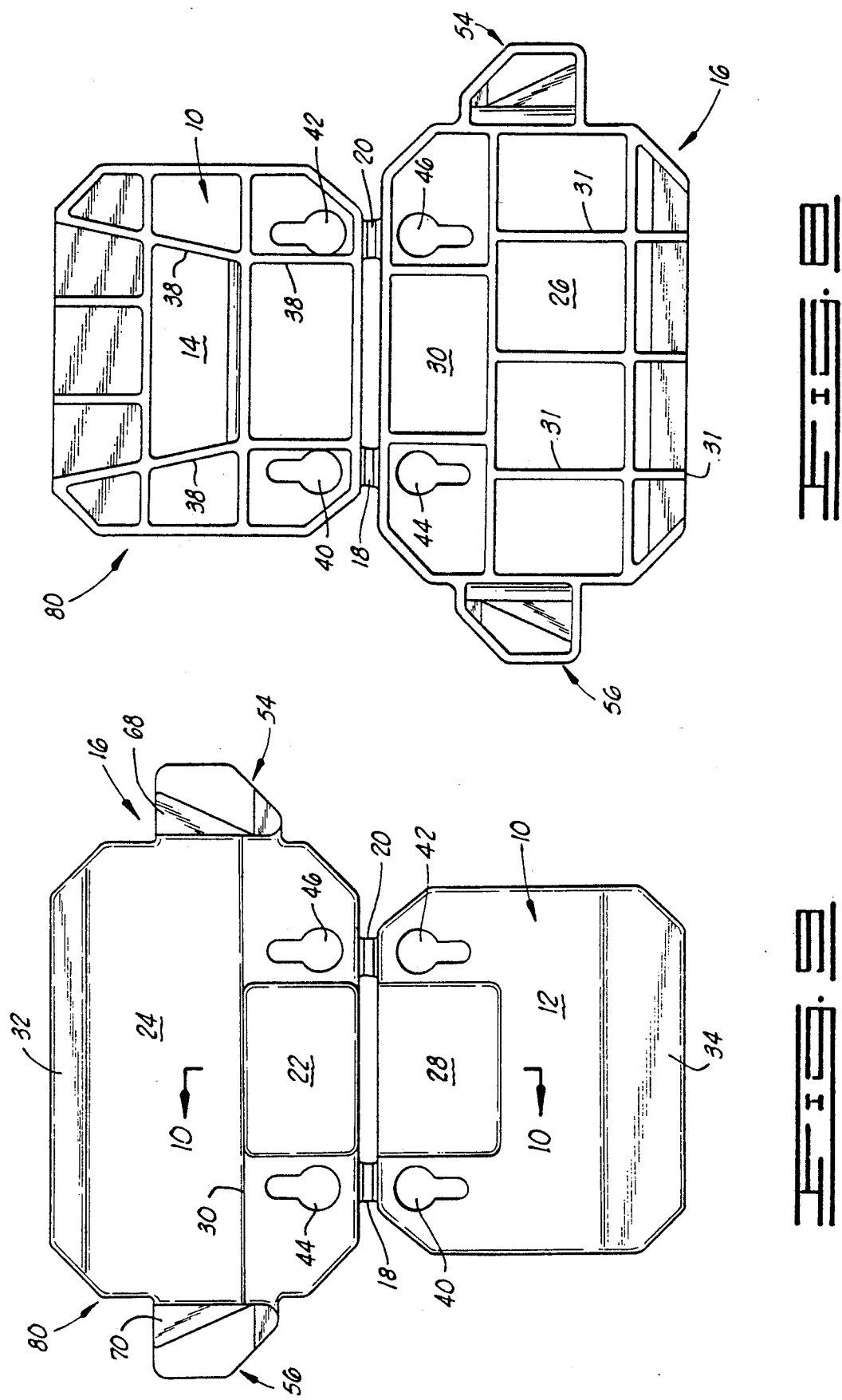

SPATULA HOLDER

FIELD OF THE INVENTION

This invention relates to devices for holding cooking utensils, and more particularly, to a wall-mountable or hood-mountable spatula holder for holding a spatula during intervals of non-use.

BRIEF DESCRIPTION OF THE PRESENT INVENTION

The present invention is a novel, lightweight, easily cleaned spatula holder which can conveniently and easily be mounted on a vertical surface, such as a wall, or, more beneficially, the vertical side panel of a hood over a cooking grill. The spatula holder can be quickly removed for cleaning, and retains the spatula in an easily accessible position for a cook using a grill. The blade of the spatula is retained in a protected position at all times.

Broadly described, the spatula holder of the invention can be thought of as a two-part structure, where the two parts act together to confine, hold and protect the spatula. The first of these two parts may be referred to as a mounting part or side, and is that part of the spatula holder which is directly mounted against a vertical surface, such as the vertical side wall of a smoke and fume hood mounted over a cooking grill. The second part is a fold-up part or side which is generally similar in configuration to the mounting part, and is connected to the mounting part by a hinge subassembly. The two parts which include the mounting part and the fold-up part can thus be folded into a juxtapositioned operative relationship for receiving and retaining a spatula in a non-use, protected position. Alternatively, the two parts can be folded into an opened out, inoperative status in which the two parts are exposed on both sides for cleaning and examination.

The spatula holder of the invention can be quickly and easily mounted to a vertical surface by means of fastener mounting elements which are extended through both the mounting part and the fold-up part to retain these two parts in juxtaposition for receiving a spatula. In this status, the blade of the spatula is inserted between the two parts and is rested on portions of the spatula holder. The blade-retaining or supporting portions of the spatula holder include a blade-support ledge which is carried on the fold-up part of the spatula holder. When the spatula holder is mounted to a vertical surface and is used to receive and hold a spatula, the blade portion of the spatula is nested or positioned between the mounting part and fold-up part of the spatula holder, and the spatula handle projects outwardly from the spatula holder in a position readily accessible to a cook who may wish to remove and use the spatula.

An important object of the present invention is to provide a lightweight, yet mechanically rugged spatula holder structure which can be quickly and easily mounted to a vertically extending surface, such as the inner surface of the vertical side or wall of a fume and smoke hood mounted over a cooking grill. The sides of the spatula holder which face toward the spatula are relatively smooth and are very easily cleaned, whereas the opposite sides of the spatula holder have reenforcing webs, ribs or partitions which impart structural strength to the spatula holder.

A further object of the invention is to provide a spatula holder which can be easily used to receive a spatula having the blade extended into the spatula holder, with the spatula handle protruding from the spatula holder for easy access.

A further object of the invention is to provide a spatula holder which is lightweight, yet strong, and is characterized by a long and trouble free operating life.

Another object of the invention is to provide a quick mounting spatula holder which can be easily mounted to one side wall of a cooking hood, or can be removed therefrom and opened apart to make accessible every part and side of the spatula holder for cleaning purposes.

Additional objects and advantages of the invention will become apparent as the following detailed description of the invention is read in conjunction with the accompany drawings which illustrate a preferred embodiment of the invention.

GENERAL DESCRIPTION OF THE DRAWINGS

FIG. 1 is an elevational view of the mounting part of a spatula holder constructed in accordance with the present invention.

FIG. 2 is an end elevation view of the spatula holder of the invention, and showing it as it appears when mounted against a vertically extending hood wall which is illustrated in FIG. 2 in dashed lines.

FIG. 3 is an end elevation view showing the opposite end of the spatula holder when it is mounted to a hood wall. The wall of the hood is illustrated in dashed lines.

FIG. 4 is an opened, inoperative end elevation view showing the spatula holder of the invention when it has been opened apart from the operative end view shown in FIG. 2 to facilitate cleaning.

FIG. 8 is a side elevation view of the spatula holder of the invention when the spatula holder is unfolded to an inoperative, opened out position.

FIG. 9 is a view of the opened out spatula holder, showing the opposite side thereof from that which is illustrated in FIG. 8.

FIG. 10 is a sectional view taken along line 10—10 of FIG. 9.

DETAILED DESCRIPTION OF A PREFERRED EMBODIMENT OF THE INVENTION

Figure 5:
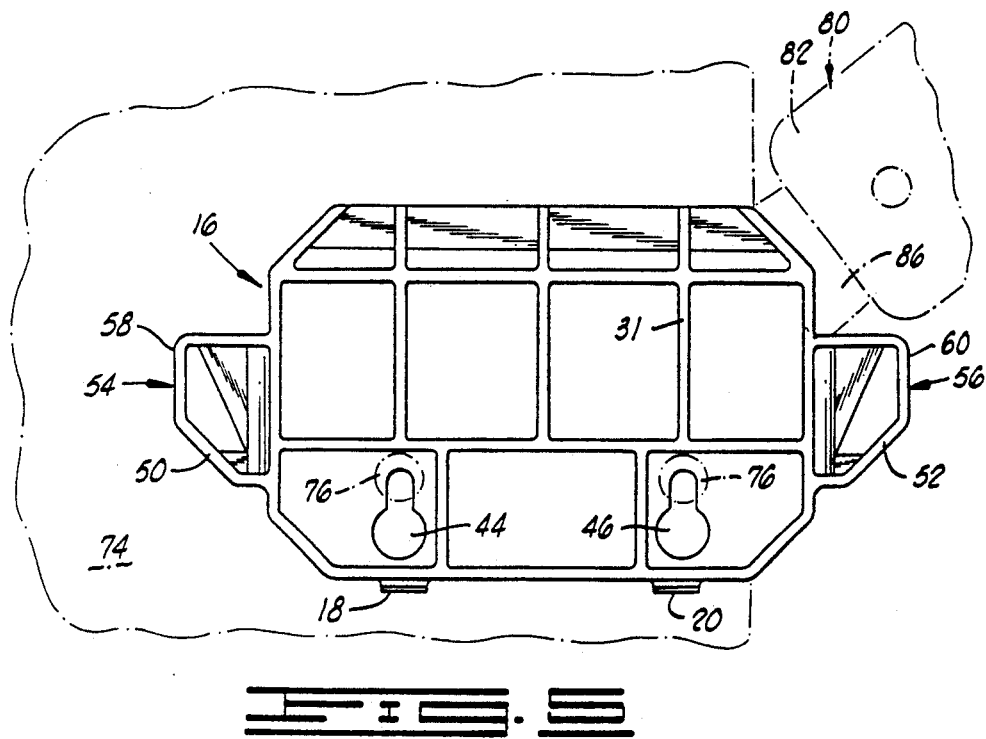
FIG. 5 is an inner side elevational view of the spatula holder, showing its appearance from the inside of a grill hood upon which the spatula holder is mounted. The handle of the spatula is shown in dashed lines, as is the vertical wall of a smoke and fume hood to which the spatula holder is mounted.

The spatula holder 8 of the invention may be best understood by initially referring to FIGS. 8 and 9. These figures show the spatula holder in its entirety, and show the two major parts of the spatula holder folded apart to their inoperative cleaning position. The two major parts of the spatula holder include a mounting part, designated generally by reference numeral 10, and being that part of the spatula holder which bears flatly against a vertical supporting surface upon which the spatula holder is mounted when it is in use. The mounting part 10 includes an inner, spatula-facing surface 12 and a wall or hood-facing surface 14 which is on the opposite side of the spatula-facing surface 12.

The second major part of the spatula holder is a fold-up part denominated generally by reference numeral 16. The fold-up part 16 is connected to the mounting side 10 by a pair of flexible hinges 18 and 20 which interconnect the two parts in the manner illustrated in FIGS. 8 and 9. These hinges 18 and 20 permit the parts to be folded together in the manner illustrated in FIGS. 2 and 3. The fold-up part 16 of the spatula holder includes a protuberant boss 22 mounted on a spatula-facing surface 24. The fold-up part 16 has a ribbed surface 26 located on the opposite side of this part from the spatula-facing surface 24. The protuberant boss 22 projects into, and mates with, a recess or cavity 28 formed in the spatula-facing side 12 of the mounting part 10.

The spatula-facing surface 24 of the fold-up side 16 defines and carries a spatula blade support ledge 30. The spatula blade support ledge 30 is best illustrated in FIG. 10 of the drawings which is a sectional view taken along line 10—10 of FIG. 9. Its function in supporting the blade of the spatula when the spatula is stored in the spatula holder will be hereinafter described.

On the reverse or opposite side of the fold-up part 16, the ribbed surface carries a series of protuberant interconnected ribs 31 which function to strengthen and reenforce the fold-up part of the spatula holder as hereinafter described. At a side edge opposite the location of the hinges 18 and 20, the fold-up part 16 carries a beveled portion which includes a beveled surface 32. The beveled surface 32 tapers outwardly from the spatula-facing surface 24 away from the mounting part 10 as illustrated in FIGS. 2 and 9. This beveled surface 32 cooperates with a corresponding beveled or tapered surface 34 on the mounting part 10 to form a funnel-shaped mouth illustrated in FIGS. 2 and 3 of the drawings. This mouth functions to guide or direct the blade of a spatula into the spatula holder 8 when the holder is mounted in its operative position.

On the reverse or opposite side of the fold-up part 16 the ribbed surface 26 carries a series of integrally formed, protuberant, interconnected reenforcing ribs 36 which function to strengthen and reenforce the fold-up part of the spatula holder. In similar fashion, the wall or hood-facing surface 14 of the mounting part 10 carries a plurality of protuberant, interconnected ribs 38 which function to strengthen and reenforce the mounting part 10.

For the purpose of mounting the spatula holder on a vertical surface, the mounting part 10 defines a pair of mounting openings or holes 40 and 42. The shape or configuration of these holes can be perceived in FIGS. 8 and 9. Each of the mounting holes 40 and 42 has a round bolt or screw head-receiving portion, and a narrow neck portion which is oriented to extend upwardly from the bolt or screw head-receiving portion when the mounting part 10 is mounted on a wall or the panel of a hood. Similarly, the fold-up part 16 defines a second pair of fastener openings or apertures 44 and 46. The fastener openings or apertures 44 and 46 are positioned in the fold-up part 16 to be in alignment with the openings 40 and 42 in the mounting part. The large bolt or screw head circular openings in the two sets of fastener apertures 40, 42, and 44, 46 will thus be aligned, as will the narrow neck portions which project upwardly therefrom when the spatula holder is mounted on a flat surface.

This arrangement, which is perhaps best illustrated in the mounted status in FIGS. 2 and 3 of the drawings, will permit the spatula holder to be quickly and easily disengaged from a wall, or from a side panel of a fume and smoke hood. This is accomplished by lifting the spatula holder upwardly so that the heads of bolts or screws used to engage the spatula holder to the wall or hood shift relatively downwardly to where such bolt or screw heads are aligned with the large circular opening portions of the fastener apertures 40, 42 and 44, 46. The spatula holder can then be removed by simply pulling it outwardly from the wall or hood until it is completely disengaged from, and free of, the bolt or screw fasteners which are used for mounting it.

Pushing up the spatula holder to facilitate its disengagement from the fasteners can be easily accomplished by pushing upwardly on the downwardly facing beveled surfaces 50 and 52 carried on a pair of protuberant ear subassemblies denominated generally by reference numerals 54 and 56. In addition to the beveled or tapered surfaces 50 and 52 carried on the protuberant ears 54 and 56, respectively, these ears are characterized in having several other surfaces. Thus, the protuberant ear 54 includes a flat end surface 58 which corresponds to a similar flat end surface 60 formed on the protuberant ear 56. A flat, upwardly facing surface 62 is formed on the upper side of the protuberant ear 54, and a similar flat, upwardly facing surface 64 is formed on the upper side of the protuberant ear 56.

A downwardly and inwardly inclined spatula-guiding and supporting surface 68 is formed on the front inner side of the protuberant ear 54. This inclined surface 68 functions to guide and support the portion of the blade which adjoins the handle of a spatula (as shown in dashed lines in FIG. 6). The protuberant ear 56 has a similar tapered surface 70 at the forward, inner side thereof and functions in the same way for supporting and guiding a part of the blade of a spatula.

The appearance of the folded-up and mounted spatula holder 8 is shown in several views of the drawings. Thus, in FIGS. 2 and 3, end elevation views of the folded-up operative spatula holder 8 are illustrated. The spatula holder 8 is here shown mounted to the inside surface of the vertically extending side panel 74 of a smoke or fume hood of the type used over a cooking grill. The spatula holder is mounted in this position by means of a pair of bolts each having a head (not visible), and a threaded shank. The shanks project through the hood panels 74 and are engaged by suitable nuts 76 as shown in FIGS. 2, 3, 6 and 7. The hood panel 74 and the nuts 76 are shown in dashed lines in the drawings.

Figure 6:
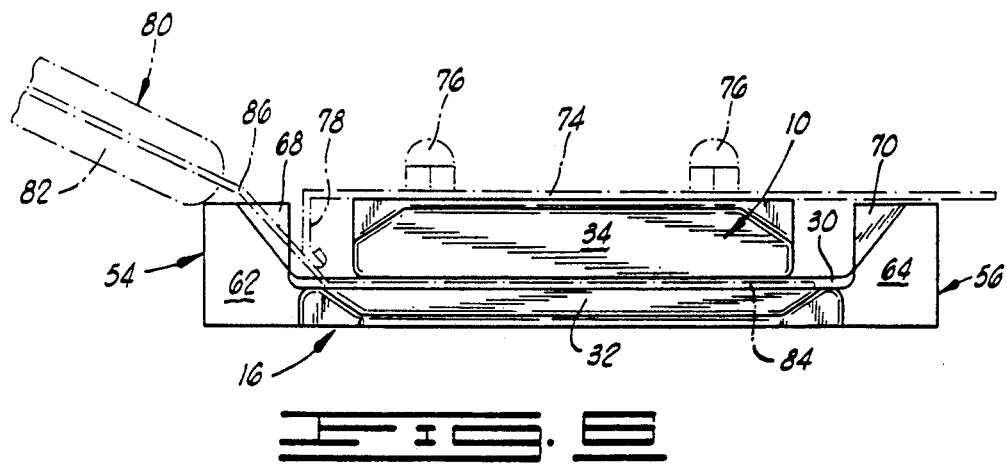
FIG. 6 is a top plan view of the spatula holder mounted upon the vertical wall of a hood, with the hood wall shown in dashed lines. A part of a spatula retained or held in the spatula holder i also illustrated in dashed lines.
Figure 7:
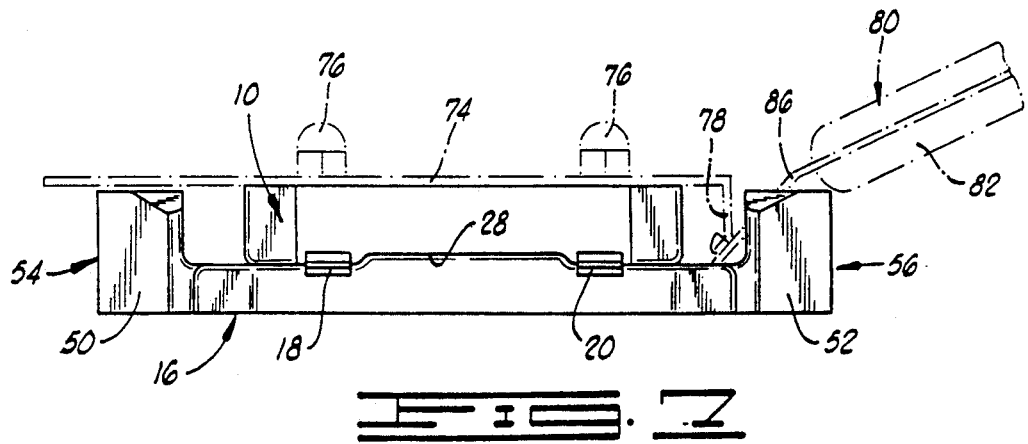
FIG. 7 is a bottom plan view of the spatula holder mounted on the wall of a hood. The hood is illustrated in dashed lines, and a spatula held in the spatula holder is also shown in lines.

It will be noted as reference is made to FIGS. 6 and 7 that the vertically extending hood panel 74, as is fairly conventional in smoke hood construction, carries an outwardly turned end flange 78. The end flange 78 cooperates with the spatula holder 8 in limiting movement of a spatula mounted in the holder as the end flange 78 bears against a part of the spatula blade positioned at the illustrated location when the spatula is held in the spatula holder.

FIGS. 5, 6 and 7 illustrate a part of a spatula 80 being held in the mounted spatula holder 8. The spatula includes a handle 82 which may conventionally be constructed of wood, plastic, hard rubber or the like. Generally it will be preferably made of a material of low thermal conductivity. The spatula 80 further includes an elongated flat spatula blade 84. The spatula blade 84 is illustrated (FIG. 6) resting upon the spatula-supporting ledge 30 carried on the spatula-facing surface 24 of the fold-up part 16. The spatula blade 84 is connected to the handle 82 by an interconnecting metallic neck portion 86 which is formed integrally with the spatula blade 84.

It should be pointed out that in a preferred construction of the spatula holder 8 of the invention, the entire spatula holder is constructed of a unitary, integrally molded synthetic resin structure. The mounting part 10, the fold-up part 16 and the interconnecting hinges 18 and 20 are all integrally formed, as are the ribs carried on each of the two principal parts of the spatula holder.

USE AND OPERATION

In the use and operation of the spatula holder of the invention, the headed screws or bolts which are to be used for mounting the spatula holder on a vertical surface, may be first secured to the surface which is to support the holder. Where bolts with threaded shanks of uniform diameter are used, as in the illustrated embodiment, and the mounting is to a side wall or side panel of a smoke and fume hood 74, the nuts 76 may be initially used to engage the threaded shanks of bolts. The bolt heads carried at the other ends of the threaded shanks are spaced outwardly from the inwardly facing surface of the hood panel 74. Preferably, the heads of these bolts (not visible) will be spaced inwardly from the inner surface of the hood panel 74 by a distance such that the bolt heads may be passed through the circular portions of the fastener openings or apertures 44 and 46 formed through the fold-up part 16 when the spatula holder 8 is mounted to the hood.

After the headed fasteners are so mounted on the supporting wall or other structural surface, the fold-up part 16 is folded up into juxtaposition to the mounting part 10 (in the fashion shown in FIGS. 2, 3, 5, 6 and 7), and while they are held in this juxtapositioned relationship, the bolt heads are extended through the circular portions of the aligned or registered aperture pairs 40, 42 and 44, 46, respectively. The two juxtapositioned parts 10 and 16 of the spatula holder 8 are then slid downwardly on the vertically extending mounting surface, such as the hood panel 74, until the heads of the fasteners are located in alignment with the narrow or reduced-width neck portions of the fastener openings or apertures 40-46. At this time, it may be desirable to slightly tighten the nuts 76 on the threaded shanks of the bolts so as to draw the bolt heads in against the ribbed surface 14 of the fold-up part 16, and thus more firmly secure the spatula holder in its operative position against the side 74 of the hood as shown in FIGS. 2, 3, 6 and 7.

With the spatula holder 8 mounted in its operative position in which the fold-up part 16 is folded into juxtaposition to the mounting part 10, the spatula holder is ready for use to receive a spatula 80 when the same is not in use for turning or moving food such as on a cooking grill located below the hood. When the spatula is to be stored in an accessible location ready for re-use as desired, the spatula blade denominated by reference numeral 84, is forced downwardly through the open mouth or guide channel formed by the opposed beveled surfaces 32 and 34 carried on the mounting part 10 and fold-up part 16, respectively. This opening and guide channel for the spatula blade is best shown in FIGS. 2 and 3 of the drawings.

The blade 84 then continues to move downwardly until the edge of the blade comes to rest upon the blade-support surface or ledge 30 formed on the spatula-facing side 24 of the fold-up part 16. The neck of the blade, denominated by reference numeral 86, is then supported on the beveled surface 68. The spatula is further retained in position by reason of the close proximity of the flange 78 carried on the hood panel 74 to the neck portion 86 of the blade 84. It will be noted that at this point in time, the spatula handle 82 projects outwardly away from the spatula holder 8 and away from the open, flanged end face of the hood so that it can be gripped with the hand without touching the hot hood. When it is desired to remove the spatula, the cook simply grasps the handle 82 and lifts upwardly, and then commences to use the spatula in any ordinary fashion for cooking.

When it is desired to remove the spatula holder for cleaning, this can be accomplished by simply lifting up on the protuberant ears 54 and 56 until the heads on the mounting bolts become aligned with the enlarged circular portions of the fastener apertures or openings 40-46. The ears 54 and 56 are then used to pull the spatula holder outwardly away from the wall or panel 74 of the hood. The spatula holder becomes completely disengaged from the hood and the mounting bolts. The fold-up part 16 can then be folded away from the mounting part 10 so that they are in the inoperative, folded out position relative to each other, as shown in FIGS. 4, 8 and 9. Thorough cleaning of the spatula holder can then be undertaken, since all parts of the spatula holder are exposed and can be accessed for removing grease, food particles or the like. It is a very easy matter to re-mount the spatula holder after cleaning. It thus need not be out of service for any significant period of time.

Although a preferred embodiment of the present invention has been herein depicted and has been described in detail, it will be understood that various changes and innovations in the illustrated embodiment of the invention can be undertaken, and many forms of it may be devised which depart in varying degrees from the embodiment shown in these drawings. Changes of this type are likely to be circumscribed by the spirit and scope of the invention, and to the extent that a reasonably broad interpretation of the appended claims can enable them to include such alternate embodiments while continuing to embrace the principle tenets of the present invention, such embodiments are intended to be encompassed by the claims as so interpreted.

What is claimed is:

1. A spatula holder comprising:
    a mounting part;
    a fold-up part; and
    a hinge subassembly interconnecting the mounting part and the fold-up part for pivotal relative movement from a status of operative juxtaposition through about 180° of pivotal movement to a status of folded out inoperative position, said fold-up part carrying a spatula blade-supporting ledge which projects toward and faces the mounting part when said mounting part and fold-up part are in a status of operative juxtaposition; and
    fastener elements for releasably mounting said spatula holder on a vertical surface with said mounting part and said fold-up part in a status of operative juxtaposition.

2. A spatula holder as defined in claim 1 wherein said mounting part has a mounting surface on one side thereof, and a spatula-facing surface on the opposite side thereof, said mounting surface having a plurality of structural reenforcing ribs thereon.

3. A spatula holder as defined in claim 1 and further characterized as including a plurality of fastener-receiving apertures opening through said mounting part for receiving said fastener elements.

4. A spatula holder as defined in claim 1 wherein said mounting part has a cavity formed therein, and said fold-up part has a protuberance formed thereon and positioned and dimensioned to mate with, and fit within, said cavity formed in said mounting part.

5. A spatula holder as defined in claim 2 and further characterized as including a plurality of fastener-receiving apertures opening through said mounting part for receiving said fastener elements.

6. A spatula holder as defined in claim 3 wherein said mounting part has a cavity formed therein, and said fold-up part has a protuberance formed thereon and positioned and dimensioned to mate with, and fit within, said cavity formed in said mounting part.

7. A spatula holder as defined in claim 6 wherein said mounting part has a mounting surface on one side thereof, and a spatula-facing surface on the opposite side thereof, said mounting surface having a plurality of structural reenforcing ribs thereon.

8. A spatula holder as defined in claim 1 wherein said mounting part, fold-up part and hinge subassembly are a single, integrally formed, molded unit.

9. A spatula holder comprising:

a mounting part have a rib-carrying mounting surface on one side thereof, and having a spatula-facing surface on the opposite side thereof, said mounting part defining a cavity which opens at the spatula-facing surface thereof;

a second part abutting the spatula-facing surface of said mounting part, and aligned with said mounting part, said second part having a first surface and defining a spatula blade-receiving gap with said mounting part, and having a second rib-carrying surface on the opposite side thereof from said first surface, a spatula blade-supporting surface projecting from said first surface toward the spatula-facing surface of said mounting part at a location adjacent said blade-receiving gap for supporting the blade of a spatula when said blade is positioned in said gap, and having a protuberance projecting from said first surface into said cavity in said mounting part; and means for detachably mounting said mounting part to a vertical surface; and means connecting said second part to said mounting part.

10. A spatula holder as defined in claim 9 wherein the mounting part, second part and means connecting said mounting part to said second part are integrated in a single unitary integrally molded unit.

11. A spatula holder as defined in claim 9 wherein said connecting means comprises a hinge pivotally interconnecting said mounting part to said second part.

12. A spatula holder as defined in claim 9 wherein said mounting part carries a first beveled surface thereon adjacent said gap, and wherein said second part carries a second beveled surface thereon adjacent said gap and facing said first beveled surface, and said first and second beveled surfaces cooperate to guide a spatula blade into said spatula blade-receiving gap.

13. A spatula holder as defined in claim 11 wherein said mounting part, second part and hinge are integrated in a single unitary integrally molded unit.

14. A spatula holder as defined in claim 13 wherein said mounting part carries a first beveled surface thereon adjacent said gap, and wherein said second part carries a second beveled surface thereon adjacent said gap and facing said first beveled surface, said first and second beveled surfaces cooperating to guide a spatula blade into said spatula blade-receiving gap.

* * * * *